(12) United States Patent
Shishihara et al.

(10) Patent No.: US 9,958,009 B2
(45) Date of Patent: May 1, 2018

(54) ROLLER BEARING

(71) Applicant: JTEKT CORPORATION, Osaka-shi, Osaka (JP)

(72) Inventors: Yuki Shishihara, Kashiwara (JP); Shigeo Kamamoto, Kashiwara (JP); Junji Murata, Kashiba (JP)

(73) Assignee: JTEKT CORPORATION, Osaka (JP)

( * ) Notice: Subject to any disclaimer, the term of this patent is extended or adjusted under 35 U.S.C. 154(b) by 0 days. days.

(21) Appl. No.: 15/392,263

(22) Filed: Dec. 28, 2016

(65) Prior Publication Data

US 2017/0204902 A1    Jul. 20, 2017

(30) Foreign Application Priority Data

Jan. 18, 2016   (JP) ................................ 2016-007344

(51) Int. Cl.
*F16C 33/46*    (2006.01)
*F16C 19/36*    (2006.01)
(Continued)

(52) U.S. Cl.
CPC ........ *F16C 33/4605* (2013.01); *F16C 19/364* (2013.01); *F16C 33/366* (2013.01);
(Continued)

(58) Field of Classification Search
CPC .............. F16C 33/6681; F16C 33/4605; F16C 19/364; F16C 33/366; F16C 33/56; F16C 33/585; F16C 33/46; F16C 33/4617; F16C 33/4623; F16C 33/4629; F16C 33/4635; F16C 33/4676

See application file for complete search history.

(56) References Cited

U.S. PATENT DOCUMENTS 4,664,537 A * 5/1987 Ascheron .............. F16C 19/364
                                              384/470
4,877,340 A * 10/1989 Hoeprich .............. F16C 19/364
                                              29/898.041
(Continued)

FOREIGN PATENT DOCUMENTS

JP    2014-231856 A    12/2014
JP    2016-089844 A     5/2016
(Continued)

*Primary Examiner* — Alan B Waits
(74) *Attorney, Agent, or Firm* — Oliff PLC

(57) ABSTRACT

A roller bearing includes an inner ring having an inner-ring raceway surface on an outer periphery of the inner ring, an outer ring arranged concentric with and peripherally outside the inner ring and having, on an inner periphery of the outer ring, an outer-ring raceway surface that faces the inner-ring raceway surface, a plurality of rollers interposed between the inner-ring raceway surface and the outer-ring raceway surface in a rollable manner, and a cage that holds the rollers at predetermined intervals along a circumferential direction. Opposite end portions of the outer-ring raceway surface in an axial direction serve as guide surfaces or which rotation of the cage is guided. Or an outer periphery of the cage, slidable contact surfaces are formed which slidably contact the guide surfaces and which are arranged to face the respective guide surfaces across a labyrinth clearance.

5 Claims, 3 Drawing Sheets

(51) Int. Cl.
*F16C 33/36* (2006.01)
*F16C 33/56* (2006.01)
*F16C 33/58* (2006.01)

(52) U.S. Cl.
CPC .............. *F16C 33/46* (2013.01); *F16C 33/56* (2013.01); *F16C 33/585* (2013.01)

(56) References Cited

U.S. PATENT DOCUMENTS

| | | | | |
|---|---|---|---|---|
| 5,007,747 | A * | 4/1991 | Takeuchi | F16C 19/225 384/450 |
| 5,328,277 | A * | 7/1994 | Moulton | F16C 9/04 384/470 |
| 5,816,713 | A * | 10/1998 | Prock | F16C 19/463 384/470 |
| 6,126,322 | A * | 10/2000 | Otsuki | F16C 19/386 277/573 |
| 6,254,277 | B1 * | 7/2001 | Nagai | F16C 19/364 384/450 |
| 6,328,477 | B1 * | 12/2001 | Tsujimoto | F16C 19/225 384/450 |
| 6,547,443 | B2 * | 4/2003 | Hanai | F16C 19/225 384/450 |
| 7,677,809 | B2 * | 3/2010 | Matsuyama | F16C 19/364 384/450 |
| 8,641,290 | B2 * | 2/2014 | Kawaguchi | F16C 19/364 384/450 |
| 8,690,450 | B2 * | 4/2014 | Itou | B24B 5/16 29/898.066 |
| 8,764,304 | B2 * | 7/2014 | Omoto | F16C 19/386 290/44 |
| 8,858,088 | B2 * | 10/2014 | Fujiwara | F16C 33/36 384/450 |
| 9,297,419 | B2 * | 3/2016 | Suzuki | F16C 19/49 |
| 9,416,823 | B2 * | 8/2016 | Okamoto | F16C 33/6681 |
| 9,664,230 | B2 * | 5/2017 | Kamamoto | F16C 33/6651 |
| 2002/0186908 | A1 * | 12/2002 | Tsujimoto | F16C 17/22 384/428 |
| 2016/0108962 | A1 | 4/2016 | Miyazaki et al. | |
| 2016/0265587 | A1 * | 9/2016 | Kamamoto | F16C 33/6629 |
| 2016/0273580 | A1 * | 9/2016 | Kajikawa | F16C 19/48 |
| 2017/0227054 | A1 * | 8/2017 | Kamamoto | F16C 33/4676 |

FOREIGN PATENT DOCUMENTS

| | | |
|---|---|---|
| JP | 2016-089845 A | 5/2016 |
| JP | 2016-089846 A | 5/2016 |
| JP | 2016-089851 A | 5/2016 |
| JP | 2016-089852 A | 5/2016 |
| JP | 2016-089853 A | 5/2016 |

\* cited by examiner

ROLLER BEARING

INCORPORATION BY REFERENCE

The disclosure of Japanese Patent Application No. 2016-007344 filed on Jan. 18, 2016 including the specification, drawings and abstract, is incorporated herein by reference in its entirety.

BACKGROUND OF THE INVENTION

1. Field of the Invention

The invention relates to a roller bearing that is lubricated with a lubricant containing foreign matter.

2. Description of the Related Art

A tapered roller bearing is known which is assembled in a transmission, a differential, or the like in automobiles, various construction machines, and the like and which is lubricated using a lubricant (oil) that lubricates a power transmission mechanism such as a transmission or a differential. The lubricant is housed in a case of the power transmission mechanism and contains a relatively large amount of foreign matter such as wear debris (iron debris) from gears.

Thus, the foreign matter contained in the lubricant enters into the roller bearing. Consequently, the foreign matter is trapped on raceway surfaces of an inner ring and an outer ring and rolling surfaces of tapered rollers to peel off the raceway surfaces and the rolling surfaces. This may make the tapered roller bearing less durable. Therefore, a conventional tapered roller bearing has been proposed in which an axially outer opening in an annular space between an outer ring and an inner ring is covered by a seal apparatus so as to prevent foreign matter from entering into a bearing interior (see, for example, Japanese Patent Application Publication No. 2014-231856 (JP 2014-231856 A)).

However, this tapered roller bearing needs the seal apparatus that suppresses entry of foreign matter. This disadvantageously increases the number of components of the tapered roller bearing and complicates the structure thereof.

SUMMARY OF THE INVENTION

An object of the invention is to provide a roller bearing having a simplified structure, while allowing suppression of entry of foreign matter into a bearing interior.

A roller bearing in an aspect of the invention includes an inner ring having an inner-ring raceway surface on an outer periphery of the inner ring, an outer ring arranged concentric with and peripherally outside the inner ring and having, on an inner periphery of the outer ring, an outer-ring raceway surface that faces the inner-ring raceway surface, a plurality of rollers interposed between the inner-ring raceway surface and the outer-ring raceway surface in a rollable manner, and a cage that holds the rollers at predetermined intervals along a circumferential direction. At least one end portion of the outer-ring raceway surface in an axial direction serves as a guide surface on which rotation of the cage is guided. On an outer periphery of the cage, a slidable contact surface is formed which slidably contacts the guide surface and which is arranged to face the guide surface across a labyrinth clearance.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
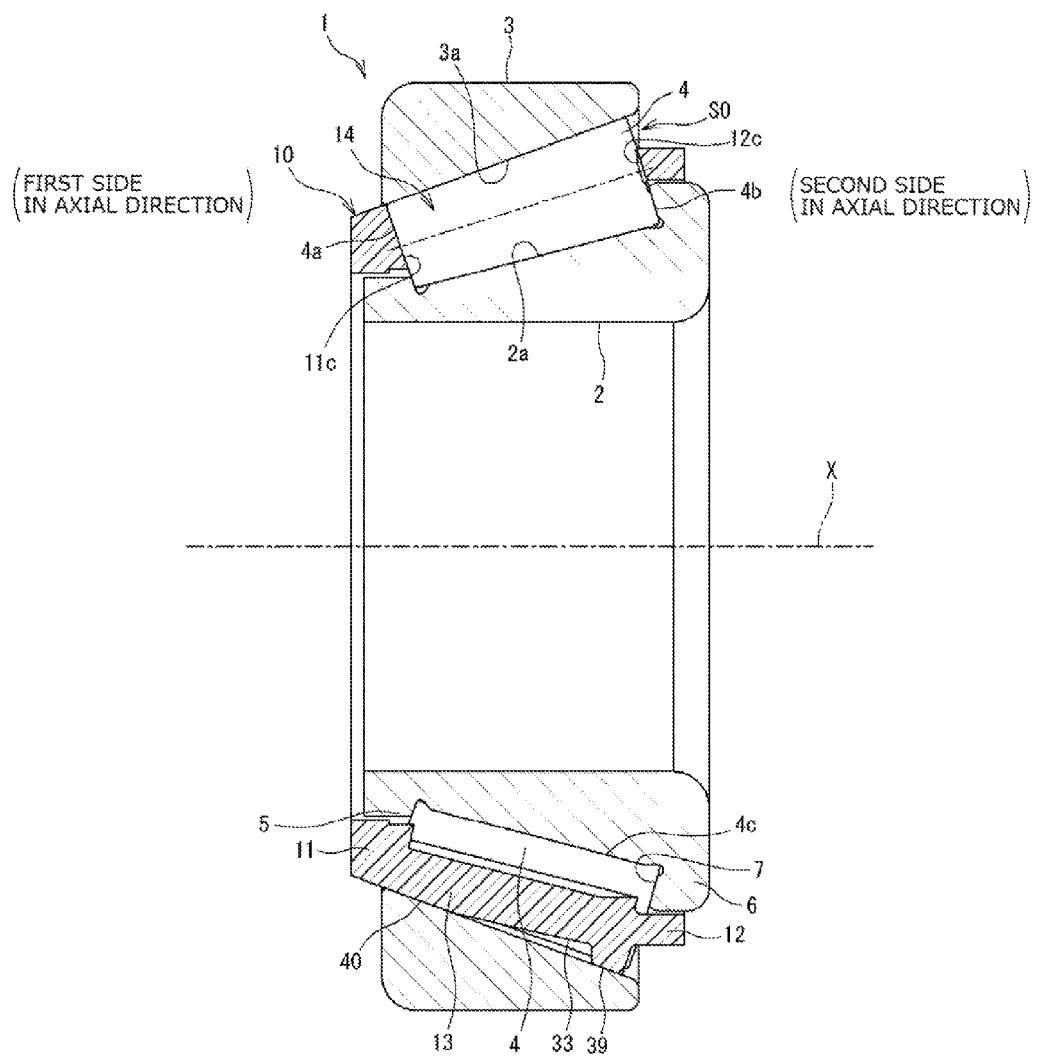
FIG. 1 is an axial sectional view depicting a tapered roller bearing according to an embodiment of the present invention.

An embodiment of an embodiment of the invention will be described below with reference to the attached drawings. FIG. 1 is an axial sectional view depicting a tapered roller bearing according to an embodiment. A tapered roller bearing 1 in the present embodiment is assembled into a transmission, a differential, or the like in automobiles, various construction machines, and the like. The tapered roller bearing 1 has an inner ring 2, an outer ring 3, a plurality of tapered rollers 4, and a cage 10 that holds the tapered rollers 4. The inner ring 2, the outer ring 3, and the cage 10 are annular (short-cylinder-shaped) members centered around a common axis X. The tapered roller bearing 1 is lubricated with a lubricant (oil) that lubricates a power transmission mechanism such as a transmission or a differential.

The inner ring 2 is formed using bearing steel, steels for machine structural use, or the like. On an outer periphery of the inner ring 2, a tapered inner-ring raceway surface 2a is formed on which a plurality of tapered rollers 4 rolls. The inner ring 2 has a cone front face rib 5 (hereinafter referred to as a small rib 5) and a cone back face rib 6 (hereinafter referred as a large rib 6). The small rib 5 is provided on an axially first side (a left side of FIG. 1) of the inner-ring raceway surface 2a so as to protrude outward in a radial direction. The large rib 6 is provided on an axially second side (a right side of FIG. 1) of the inner-ring raceway surface 2a so as to protrude outward in the radial direction. Like the inner ring 2, the outer ring 3 is formed using bearing steel, steels for machine structural use, or the like. On an inner periphery of the outer ring 3, a tapered outer-ring raceway surface 3a is formed which faces the inner-ring raceway surface 2a and on which the tapered rollers 4 roll.

The tapered rollers 4 are members formed using bearing steel or the like. The tapered rollers 4 are interposed between the inner-ring raceway surface 2a and the outer-ring raceway surface 3a in a rollable manner. A circular-cone-shaped rolling surface 4c is formed on an outer periphery of each of the tapered rollers 4. The tapered roller 4 has a small end face 4a located on the first side in the axial direction and having a small diameter and a large end face 4b on a second side in the axial direction and having a large diameter. The large end face 4b slidably contacts a flange face 7 of the large rib 6.

Figure 2:
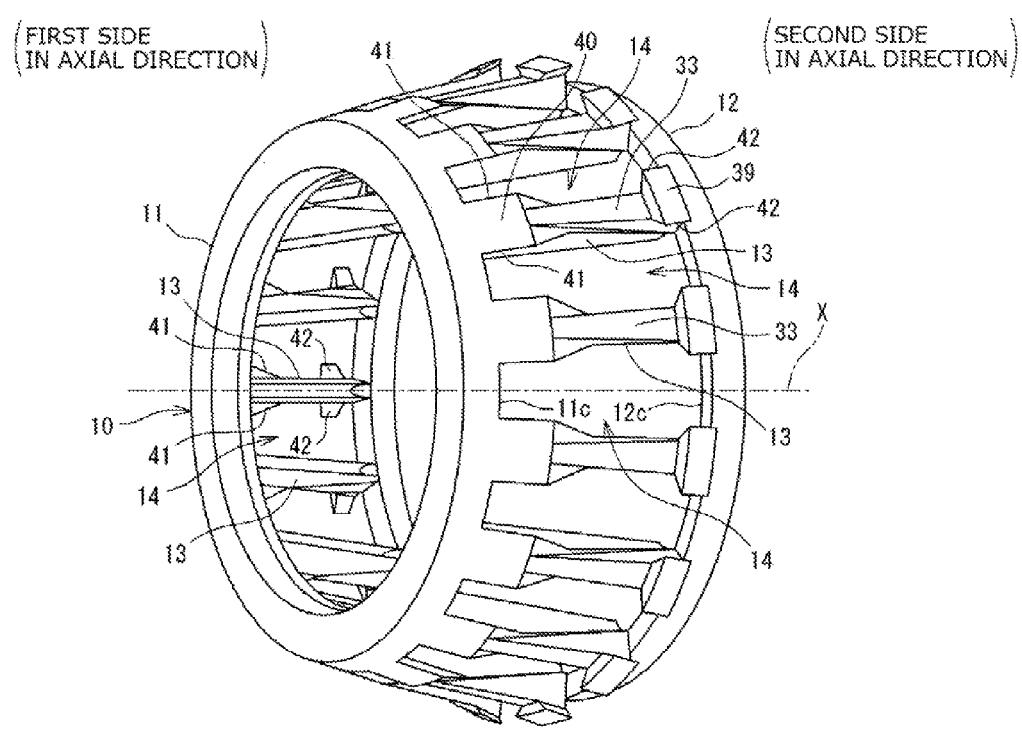
FIG. 2 is a perspective view depicting a cage in the tapered roller bearing.

FIG. 2 is a perspective view depicting the cage 10. In FIG. 1 and FIG. 2, the cage 10 has a small-diameter annular portion 11 on the first side in the axial direction, a large-diameter annular portion 12 on the second side in the axial direction, and a plurality of cage bars 13. The small-diameter annular portion 11 and the large-diameter annular portion 12 are shaped like circular rings and provided at a predetermined distance from each other. The cage bars 13 are provided at intervals in a circumferential direction to couple the annular portions 11, 12 together. Pockets 14 in which respective tapered rollers 4 are housed (held) each correspond to a space formed between the annular portions 11, 12 and between two cage bars 13, 13 adjacent to each other in the circumferential direction. The cage 10 in the present embodiment is formed of a resin material such as a polyphenylene sulfide resin (PPS resin).

In FIG. 1, the cage 10 is provided in an annular space S0 formed between the inner ring 2 and the outer ring 3. One tapered roller 4 is housed in each of the pockets 14, and the tapered rollers 4 are arranged and held at regular intervals in the circumferential direction. The small-diameter annular portion 11 is positioned outward of the small rib 5 of the inner ring 2 in the radial direction. The large-diameter annular portion 12 is positioned outward of the large rib 6 of the inner ring 2 in the radial direction.

In FIG. 1, in the cage 10, axially inner surfaces 11c, 12c of the annular portions 11, 12 that face the pockets 14 can contact the small end face 4a and the large end face 4b, respectively, of each of the tapered rollers 4. This regulates movement of the cage 10 in the axial direction. In the present embodiment, in particular, the axially inner surface 12c contacts the large end face 4b to regulate the movement of the cage 10 in the axial direction. In other words, the annular portions 11, 12 contact the tapered rollers 4 to position the cage 10 in the axial direction.

The cage 10 is positioned in the radial direction by bringing a part of the cage 10 (slidable contact surfaces 40, 39) into slidable contact with the outer-ring raceway surface 3a of the outer ring 3. A configuration that achieves this will be described. In FIG. 2, the cage 10 has first roller retaining portions 41 and second roller retaining portions 42 formed integrally with each of the cage bars 13. A part (small-diameter annular portion 11 side) of a radially outer surface of the cage bar 13 and a radially outer surface of the first roller retaining portion 41 form a continuous smooth circular-arc surface. The remaining part (large-diameter annular portion 12 side) of the radially outer surface of the cage bar 13 and a radially outer surface of the second roller retaining portion 42 form a continuous smooth circular-arc surface.

The circular arc surfaces are shaped along a virtual tapered surface having a slightly smaller diameter than the outer-ring raceway surface 3a of the outer ring 3. The circular arc surfaces serve as slidable contact surfaces 40, 39 that can slidably contact the outer-ring raceway surface 3a (guide surfaces 3b, 3c to be described later) of the outer ring 3. The slidable contact surfaces 40, 39 slidably contact the outer-ring raceway surface 3a of the outer ring 3 to position the cage 10 in the radial direction. The slidable contact surface 40 includes a part of an outer peripheral surface of the small-diameter annular portion 11.

In FIG. 2, a recessed portion 33 that is recessed inward in the radial direction to make the adjacent pockets 14, 14 in communication with each other is formed on a radially outer side of each of the cage bars 13. Consequently, a portion of the lubricant located near the outer-ring raceway surface 3a of the outer ring 3 can be allowed to flow between the adjacent pockets 14, 14. This allows the stirring resistance of the lubricant to be weakened.

In FIG. 1, in the tapered roller bearing 1, the outer ring raceway surface 3a of the outer ring 3 has a diameter increasing from the first side toward the second side in the axial direction. Thus, rotation of the tapered roller bearing 1 (in the present embodiment, the inner ring 2) causes the lubricant to flow from the first side toward the second side in the axial direction through an annular space S0 formed between the inner ring 2 and the outer ring 3 (pump action). Such a pump action resulting from rotation of the tapered roller bearing 1 flows the lubricant in a bearing exterior to flow from the axially first side of the tapered roller bearing 1 into the annular space S0 between the inner ring 2 and the outer ring 3 and out from the axially second side of the tapered roller bearing 1. In other words, the lubricant passes through the annular space S0. As described above, in the tapered roller bearing 1 depicted in FIG. 1, the axially first side corresponds to an inlet side for the lubricant, and the axially second side corresponds to an outlet side for the lubricant.

The lubricant that lubricates the tapered roller bearing 1 is housed in a case of a power transmission mechanism such as a transmission or a differential and contains a relatively large amount of foreign matter such as wear debris (iron debris) from gears. Thus, the tapered roller bearing 1 in the present embodiment is configured to restrain the foreign matter contained in the lubricant from entering into the bearing interior. The configuration will be described below.

Figure 3:
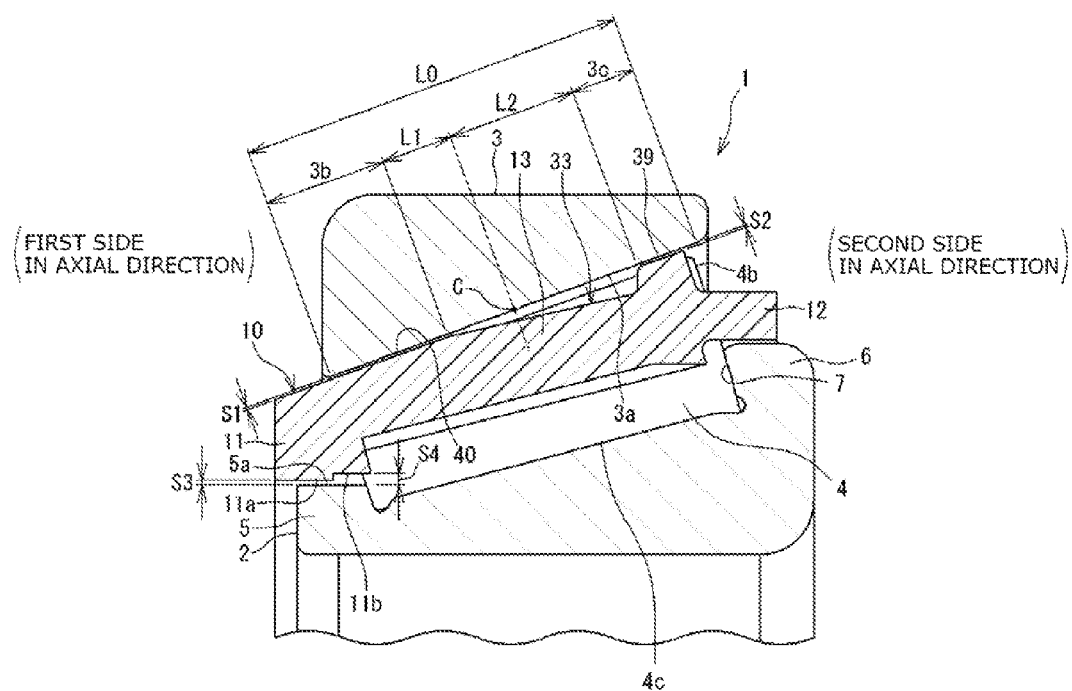
FIG. 3 is an enlarged sectional view of an important part of FIG. 1.

FIG. 3 is an enlarged sectional view of an important part of FIG. 1. Crowning is applied to the outer-ring raceway surface 3a of the outer ring 3 all over the length of the outer-ring raceway surface 3a in the axial direction such that the outer-ring raceway surface 3a protrudes slightly inward in the radial direction so as to appear like a circular arc in section. Axially opposite end portions of the outer-ring raceway surface 3a serve as a first guide surface 3b and a second guide surface 3c on which rotation of the cage 10 is guided. The axially-first-side slidable contact surface 40 of the cage 10 slidably contacts the first guide surface 3b. The axially-second-side slidable contact surface 39 of the cage 10 slidably contacts the second guide surface 3c.

The first and second guide surfaces 3b, 3c are formed at respective positions away from the neighborhood of a crowning center C of the outer-ring raceway surface 3a in the axial direction. Specifically, a length L1 from the crowning center C to the first guide surface 3b on the outer-ring raceway surface 3a is set to be 20% or more of a raceway surface effective length L0 of the outer-ring raceway surface 3a. Similarly, a length L2 from the crowning center C to the second guide surface 3c on the outer ring raceway surface 3a is set to be 20% or more of the raceway surface effective length L0 of the outer-ring raceway surface 3a. Setting the lengths L1, L2 in this manner allows the first and second guide surfaces 3b, 3c to contact the corresponding slidable contact surfaces 40, 39 at the respective positions away from the neighborhood of the crowning center C, where the highest contact surface pressure is exerted between the first and second guide surfaces 3b, 3c and the slidable contact surfaces 40, 39. Consequently, the contact surface pressure can be reduced.

The slidable contact surface 40 of the cage 10 is arranged so as to face the first guide surface 3b across a labyrinth clearance S1. Similarly, the slidable contact surface 39 of the cage 10 is arranged so as to face the second guide surface 3c across a labyrinth clearance S2. In the present embodiment, the cage 10 is made eccentric with respect to the outer ring 3. Consequently, with circumferentially particular portions (a lower side of FIG. 3 (not depicted in the drawings)) of the slidable contact surfaces 40, 39 of the cage 10 in contact with the guide surfaces 3b, 3c, respectively, of the outer ring 3, the labyrinth clearances S1, S2 are formed circumferentially opposite (an upper side of FIG. 3) to these portions. The labyrinth clearances S1, S2 are set, for example, to 100 μm. Forming the labyrinth clearances S1, S2 in this manner restrains foreign matter from entering onto the inner-ring raceway surface 2a and the outer-ring raceway surface 3a in the bearing interior from the opposite sides of the tapered roller bearing 1 in the axial direction.

An outer-peripheral cylindrical surface 5a centered around the axis X is formed on an outer periphery of the small rib 5 of the inner ring 2. On an inner periphery of the small-diameter annular portion 11 of the cage 10, a first inner-peripheral cylindrical surface 11a centered around the axis X is formed in an outer portion in the axial direction, whereas a second inner-peripheral cylindrical surface 11b centered around the axis X is formed in an inner portion in the axial direction. The second inner-peripheral cylindrical surface 11b is formed to have a larger diameter than the first inner-peripheral cylindrical surface 11a.

The first inner-peripheral cylindrical surface 11a of the small-diameter annular portion 11 is arranged to face the outer-peripheral cylindrical surface 5a of the small rib 5 across a labyrinth clearance S3. In the present embodiment, the cage 10 is made eccentric with respect to the inner ring 2. Consequently, with a circumferentially particular portion (the lower side of FIG. 3 (not depicted in the drawings)) of the first inner-peripheral cylindrical surface 11a in contact with the outer-peripheral cylindrical surface 5a of the small rib 5, the labyrinth clearance S3 is formed circumferentially opposite (the upper side of FIG. 3) to this portion. The labyrinth clearance S3 is set, for example, to 200 μm. Forming the labyrinth clearance S3 in this manner restrains foreign matter from entering onto the inner-ring raceway surface 2a in the bearing interior through the axially first side of the tapered roller bearing 1.

A clearance S4 between the second inner-peripheral cylindrical surface 11b of the small-diameter annular portion 11 and the outer-peripheral cylindrical surface 5a of the small rib 5 starts to increase drastically in size at an axially inner end of the labyrinth clearance S3. This increases a pressure loss to the lubricant flowing from the labyrinth clearance S3 to the clearance S4. Consequently, the pressure of the lubricant flowing through the clearance S4 is higher than the lubricant flowing through the labyrinth clearance S3. Thus, the lubricant is less likely to flow from the first side toward the second side (toward the clearance 4) in the axial direction. This results in a reduced amount of the lubricant flowing from the labyrinth clearance S3 onto the inner-ring raceway surface 2a. Accordingly, the foreign matter contained in the lubricant can be further restrained from entering onto the inner-ring raceway surface 2a.

The cage 10 is formed of a resin material, for example, a polyphenylene sulfide resin (PPS). The cage 10 is hard enough to bury, into the cage 10, the foreign matter having entered into the labyrinth clearances S1 to S3. Specifically, the cage 10 in the present embodiment has a Rockwell hardness of R110 to 120. The Rockwell hardness is set within such a range because an excessively high surface hardness of the cage 10 hinders the foreign matter from being appropriately buried in the cage 10 and because an excessively low surface hardness of the cage 10 reduces wear resistance thereof.

In the tapered roller bearing in the present embodiment, the slidable contact surfaces 40, 39 formed on the outer periphery of the cage 10 are arranged to face the guide surfaces 3b, 3c, respectively, of the outer-ring raceway surface 3a across the labyrinth clearances S1, S2, respectively, as described above. Consequently, the foreign matter contained in the lubricant can be restrained from entering onto the outer-ring raceway surface 3a from the opposite sides of the tapered roller bearing 1 in the axial direction. Therefore, the outer-ring raceway surface 3a and the rolling surface 4c of each tapered roller 4 can be restrained from being peeled off. As a result, the tapered roller bearing 1 can be made more durable. This eliminates the need to add a new member to suppress entry of the foreign matter, allowing the structure of the tapered roller bearing 1 to be simplified.

The slidable contact surface 40 (39) of the cage 10 slidably contacts the guide surface 3b (3c) formed away from the neighborhood of the crowning center C on the outer-ring raceway surface 3a in the axial direction. Consequently, compared to a case where the guide surface 3b (3c) is formed near the crowning center C, the above-described configuration enables a reduction in the contact surface pressure between the slidable contact surface 40 (39) and the guide surface 3b (3c). Thus, even when foreign matter enters between the slidable contact surface 40 (39) and the guide surface 3b (3c), the slidable contact surface 40 (39) and the guide surface 3b (3c) can be restrained from being peeled off by the foreign matter. As a result, the tapered roller bearing 1 can be made more durable.

The first inner-peripheral cylindrical surface 11a of the small-diameter annular portion 11 of the cage 10 is arranged to face, across the labyrinth clearance S3, the outer-peripheral cylindrical surface 5a located on the first side of the inner ring 2 in the axial direction. Thus, the foreign matter contained in the lubricant can be restrained from entering from the outer-peripheral cylindrical surface 5a side (the inlet side for the lubricant) of the inner ring 2 onto the inner-ring raceway surface 2a. Consequently, the inner-ring raceway surface 2a and the rolling surface 4c of each tapered roller 4 can be restrained from being peeled off. As a result, the tapered roller bearing 1 can be made more durable.

The cage 10 is formed of a resin material that is hard enough to bury, into the cage 10, the foreign matter having entered into the labyrinth clearances S1 to S3. Consequently, even when entering into the labyrinth clearances S1 to S3, the foreign matter contained in the lubricant can be buried in the cage 10. Thus, the foreign matter can be further restrained from entering onto the inner-ring raceway surface 2a or the outer-ring raceway surface 3a. Only a low contact surface pressure is exerted between the guide surface 3b (3c) and the slidable contact surface 40 (39), onto which the foreign matter is buried. Thus, the slidable contact surface 40 (39) and the guide surface 3b (3c) can be restrained from being peeled off by the buried foreign matter.

The disclosed embodiment is illustrative and is not restrictive. The scope of the right of the invention is indicated by the claims and includes all variations within the range of the configurations in the claims and the equivalents. For example, in the above description, the invention is applied to the tapered roller bearing. However, the invention is also applicable to a cylindrical roller bearing. In the present embodiment, the opposite end portions of the outer-ring raceway surface in the axial direction serve as the guide surfaces on which rotation of the cage is guided. However, at least one end portion of the outer-ring raceway surface in the axial direction may serve as a guide surface. In the present embodiment, the labyrinth clearances S1, S3 are formed on the outer periphery and the inner periphery, respectively, of one end portion of the cage in the axial direction. However, the labyrinth clearance may be formed at least on the outer periphery of one end portion of the cage in the axial direction.

The roller bearing in the present invention has a simplified structure, while allowing suppression of entry of foreign matter into the bearing interior.

What is claimed is:
1. A roller bearing comprising:
   an inner ring having an inner-ring raceway surface on an outer periphery of the inner ring;

an outer ring arranged concentric with and peripherally outside the inner ring and having, on an inner periphery of the outer ring, an outer-ring raceway surface that faces the inner-ring raceway surface;

a plurality of rollers interposed between the inner-ring raceway surface and the outer-ring raceway surface in a rollable manner; and a cage that holds the rollers at predetermined intervals along a circumferential direction, the cage being provided with a plurality of cage bars, wherein at least one end portion of the outer-ring raceway surface in an axial direction serves as a guide surface on which rotation of the cage is guided, and on an outer periphery of the cage, a slidable contact surface is formed which slidably contacts the guide surface and which is arranged to face the guide surface across a labyrinth clearance, axially opposite end portions of the outer-ring raceway surface respectively serve as a first guide surface and a second guide surface on which rotation of the cage is guided, an axially-first-side slidable contact surface of the cage slidably contacting the first guide surface, and an axially-second-side slidable contact surface of the cage slidably contacting the second guide surface, a recessed portion that is recessed inward in the radial direction is formed on a radially outer side of each of the plurality of cage bars, and a diameter of a radially outer surface of at least one of the plurality of cage bars expands axially from the axially-first-side slidable contact surface to the axially-second-side slidable contact surface, crowning is applied to the outer-ring raceway surface, and the guide surface is formed away from a crowning center on the outer-ring raceway surface in the axial direction.

2. The roller bearing according to claim 1, wherein, on an outer periphery of the inner ring, an outer-peripheral cylindrical surface is formed on a first side of the inner-ring raceway surface in the axial direction, and on an inner periphery of the cage, an inner-peripheral cylindrical surface is formed which is arranged to face the outer-peripheral cylindrical surface of the inner ring across a labyrinth clearance.

3. The roller bearing according to claim 1, wherein the cage is formed of a resin material that has a Rockwell hardness of R110 to R120.

4. The roller bearing according to claim 2, wherein the cage is formed of a resin material that has a Rockwell hardness of R110 to R120.

5. The roller bearing according to claim 1, wherein the cage includes a small-diameter annular portion, and on an inner periphery of the small-diameter annular portion, a first inner-peripheral cylindrical surface is centered around an axis formed in an outer portion in the axial direction, and a second inner-peripheral cylindrical surface is centered around an axis formed in an inner portion in the axial direction, the second inner-peripheral cylindrical surface having a larger diameter than the first inner-peripheral cylindrical surface.

\* \* \* \* \*